United States Patent

[11] 3,579,103

| | | |
|---|---|---|
| [72] | Inventor | Charles H. Russell<br>Newport News, Va. |
| [21] | Appl. No. | 863,913 |
| [22] | Filed | Oct. 6, 1969 |
| [45] | Patented | May 18, 1971 |
| [73] | Assignee | the United States of America as represented by the Administrator of the National Aeronautics and Space Administration |

[54] ANALOG-TO-DIGITAL CONVERTER TESTER
10 Claims, 2 Drawing Figs.

[52] U.S. Cl. .................................................. 324/73,
340/347AD, 324/5
[51] Int. Cl. ..................................................... G01r 15/12
[50] Field of Search ........................................... 324/73 (R),
73 (AT), 158 (SY), 28 (SEQ), 51, 52, (Inquired);
340/347 (AD); 235/151.31, 151.13

[56] References Cited
UNITED STATES PATENTS

| | | | |
|---|---|---|---|
| 2,849,677 | 8/1958 | Hannon ........................ | 324/73 |
| 3,082,374 | 3/1963 | Buuck ......................... | 235/151.13 |
| 3,197,695 | 7/1965 | Wingfield ..................... | 324/51 |

*Primary Examiner*—Michael J. Lynch
*Attorneys*—Howard J. Osborn, William H. King and G. T. McCoy

ABSTRACT: Apparatus for automatically testing an ADC for open and short circuits. A tester is connected to the contacts on the ADC shaft. The ADC motor turns the ADC shaft to a specific setting and in response to this setting means are provided for stopping the motor and producing a signal having a predetermined duration which is applied to the tester. The tester, in response to this signal, performs the open and short circuit tests for the specific setting of the ADC shaft. If there are no open or short circuits, the tester produces another signal which causes the ADC motor to turn the ADC shaft to another specific setting for testing. If there is an open or short circuit, the tester does not produce said another signal and a buzzer sounds. The operator can then look at lights on the tester to determine where the open or short circuit is located.

INVENTOR.
CHARLES H. RUSSELL

INVENTOR.
CHARLES H. RUSSELL
BY
William H. King
ATTORNEYS

ANALOG-TO-DIGITAL CONVERTER TESTER

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The invention relates generally to an analog-to-digital converter (ADC) tester and more specifically concerns a device for automatically verifying acceptable performance of a shaft-type analog-to-digital converter.

Prior to the development of this invention the verification of an ADC was manually performed. A visual display was used to facilitate monitoring the ADC shaft position as it was manually rotated. The major disadvantage of the manual testing method was the excessive time required to position the ADC shaft to all unique positions. The invention reduces the actual man-hours required for testing by a factor of at least 18.

SUMMARY OF THE INVENTION

This invention was designed to test the summary punch wiring configuration of a decimally coded ADC. This type of wiring configuration simplifies automatic testing since only 10 positions require interrogation to establish ADC performance. Once the wiring of each decade has been verified, the major test requirement is to establish an acceptable confidence level in the reliability of moving parts in the ADC. Inasmuch as each decade can assume an infinite number of angular positions, numerous short circuits and open circuits can develop during use. Hence, thousands of readings are required to establish, at an acceptable confidence level, the reliability of the ADC.

The unique feature of this invention is the technique used to verify acceptable performance of an ADC, that is, the technique used to test for short and open circuits in the ADC. Maintenance records indicate that the major problem areas include: indexing (resolving reading ambiguity), short circuits (primarily between digit lines), and open circuits (usually between digit line and the decade wiper arm). Each of these problems is agitated by extensive wear of the ADC contacts resulting from rotation of the ADC input shaft. Rotation is an important factor in testing an ADC since in normal application short and open circuits will develop due to arcing, metal transfer and grooving typically encountered in commutating-type equipment. Therefore, a test to verify proper performance in these three areas should include rotating the ADC before each circuit verification. Also the verification test should simulate voltage and current conditions the ADC will actually experience in the user's application.

The invention provides a repetitive type test cycle which performs the angular positioning and ADC verification test automatically. It also identifies the type and location of failures. This invention has two basic units: (1) an electrical unit which coordinates all testing sequences and interrogates the ADC to establish circuit validity and (2) a mechanical unit which contains a counter, a motor, a magnetic brake and a gearbox which provides ADC shaft positioning and a visual indication of the ADC reading. Two-way communication exists between the programmer and the mechanical unit.

The gearbox contains gears to drive the decaded shafts. Each shaft drives a 10-point cam. Each 10-point cam operates a switch 10 times for each revolution for each associated decade. Operation of this switch signals the programmer which in turn provides the control signals required to apply the brake, test the ADC for short and open circuits, and restart the drive unit—assuming the ADC circuit tests are valid. This type cycle will be repeated after each one-tenth revolution of the decade under test. The programmer counts the number of test cycles and allocates 10 per decade. This counting technique also facilitates the transfer of cycle control to the decade under test by providing the appropriate 10 to 1 ratio corresponding to the 10 to 1 gear ratio between adjacent decades. Since the gearbox input shaft is coupled to the units decade, an angular rotation of one-tenth revolution represents one one-hundred thousands of a revolution in the ten-thousand decades (assuming a five-decade ADC).

Short circuit tests are performed by sequentially applying a test voltage to each of the 10-digit positions (0—9) of all decades. The coils of 10 relays monitor this interrogation. One set of contacts on these relays is connected in a configuration that will maintain voltage on the relays associated with a short even though the interrogate voltage is removed. A second set of relay contacts is connected to lights to indicate the location of any short circuit. A third set is seriesed and is used to inhibit or permit the test to progress depending on test validity.

Open circuits are tested by connecting a relay coil to the arm (wiper contact) of each ADC decade which also monitors the interrogation voltage.

Each relay utilizes a set of its own contacts to maintain an energized state once energized by the interrogate signal. A second set of contacts on each relay is seriesed and becomes a part of the inhibit circuit mentioned previously. The programmer interrogates this inhibit circuit, which represents short and open circuit status, to obtain a "continue cycle" signal. A third set of contacts on the relay is used to indicate location of open circuits.

DESCRIPTION OF THE PREFERRED EMBODIMENT

Figure 1:
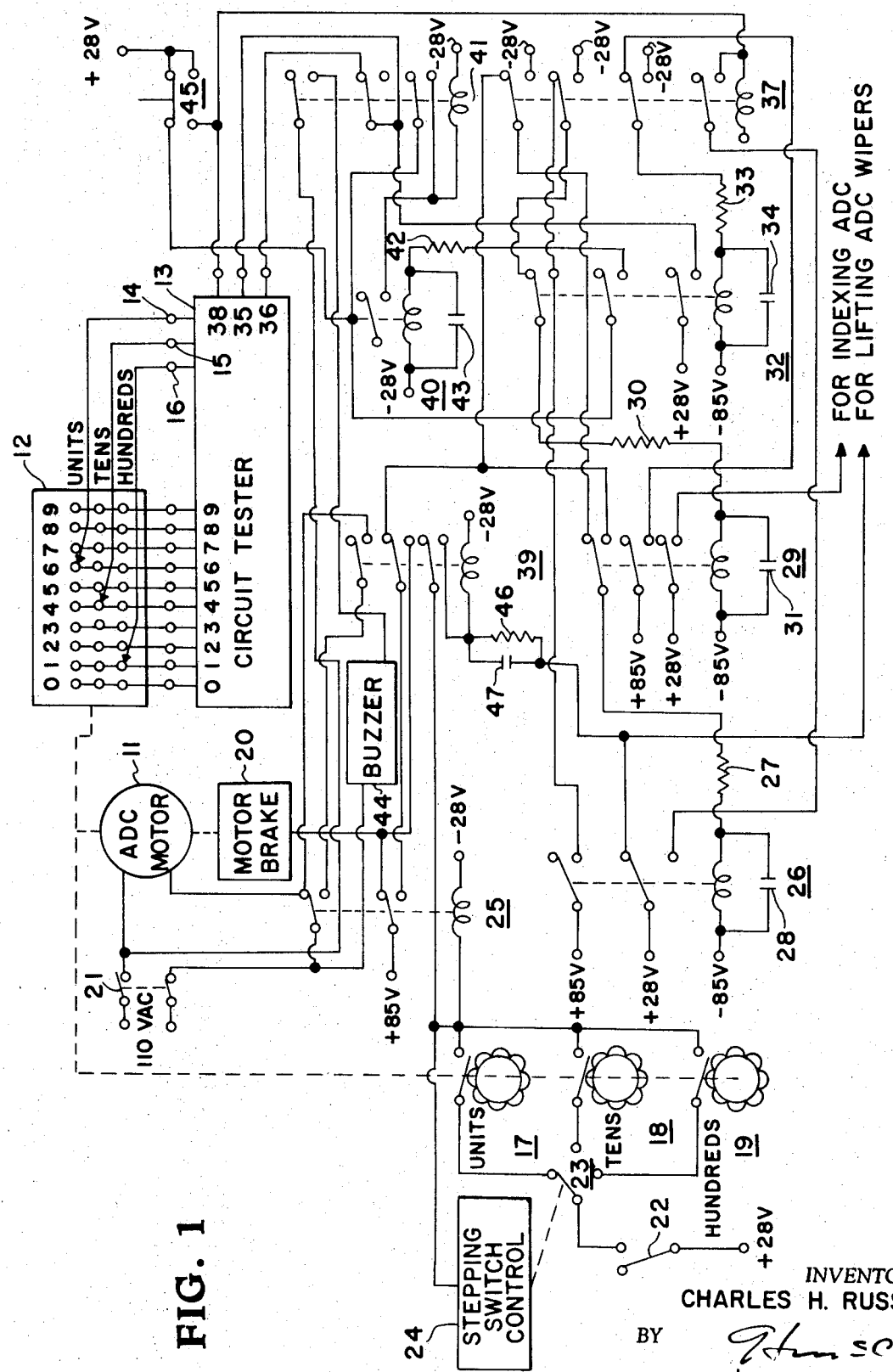
FIG. 1 is a schematic drawing of an embodiment of the invention.

Turning now to the embodiment of the invention selected for illustration in the drawing the number 11 in FIG. 1 designates an ADC motor coupled to the shaft of the ADC 12 under test. The ADC shown is a simplified ADC for the purpose of illustration. This ADC has only units, tens and hundreds stator contacts. However, it is to be understood that this invention can be used to test ADC's having many more decades. To detect short circuits, all of the 0 contacts are connected together and to the 0 terminal of a circuit tester 13; all of the 1 contacts are connected together and to the 1 terminal of tester 13, etc. To detect open circuits, the units wiper arm of the ADC is connected to terminal 14 of tester 13, the tens wiper arm is connected to terminal 15 and the hundreds wiper arm is connected to terminal 16 of tester 13. A motor brake 17 is coupled to ADC motor 11 and a switch 21 is provided for applying 110 v. AC to the circuit.

The ADC motor 11 is also coupled to a units cam switch 17, a tens cam switch 18 and a hundreds cam switch 19. The switch cams are geared together by a gearbox (not shown) such that for every 10 revolutions of the cam-operating switch 17, the cam-operating switch 18 turns one revolution and for every 10 revolutions of the cam-operating switch 18, the cam-operating switch 19 turns one revolution. Each time either of the cams rotates one-tenth of a revolution, its associated switch closes. A switch 22 is provided for applying +28 v. to a stepping switch 23. Stepping switch 23 is controlled by a stepping switch control 24. Each time one of the cam switches operates 10 times, the stepping switch 23 is caused to step to its next position by control 24. The details of stepping switch control 24 are not disclosed. However, it can merely be a counting means for counting the times that the +28 v. is applied to it and producing a pulse for operating the stepping switch each time the count reaches 10.

The outputs of switches 17, 18 and 19 are connected together and to the coil of a relay 25. Whenever +28 v. is applied through one of the switches to relay 25, it is activated and stops motor 11 by disconnecting the 110 v. AC from the motor and by activating the motor brake 20. A relay 26 is provided for lifting the ADC solenoid while the circuit tester 13 is operative. An integrating network consisting of a resistor 27 and a capacitor 28 is used to delay the operation of relay 26 to assure adequate time for any ADC input shaft coast before removing ADC solenoid voltage. The function of relay 29 is to provide indexing voltage to the ADC. An integrating network consisting of a resistor 30 and a capacitor 31 is used to delay the operation of relay 29 to assure wiper contact bounce has settled before ADC contact interrogation. The purpose of relay 32 is to initiate the scan circuit tester 13 which tests for short and open circuits. Resistor 33 and capacitor 34 form a network for delaying the operation of relay 32. When relay 32 is actuated, +28 v. is applied to terminals 35 and 36 of tester 13. A relay 37 is provided for resetting all relays in response to a signal from terminal 38 of tester 13. A relay 39, when actuated, restarts motor 11 and runs it until the next cam valley is reached. The function of relay 40 is to activate relay 41 a certain period of time (approximately 3 seconds) after relay 40 is activated. This period of time is determined by the network consisting of resistor 42 and capacitor 43. Relay 41, when activated, disconnects the +28 v. from terminal 35 of tester 13 and applies voltage to buzzer 44 indicating an open or short circuit in the ADC. Switch 45 is a manual switch for resetting all relays to start testing again once an open or short circuit has been discovered.

Figure 2:
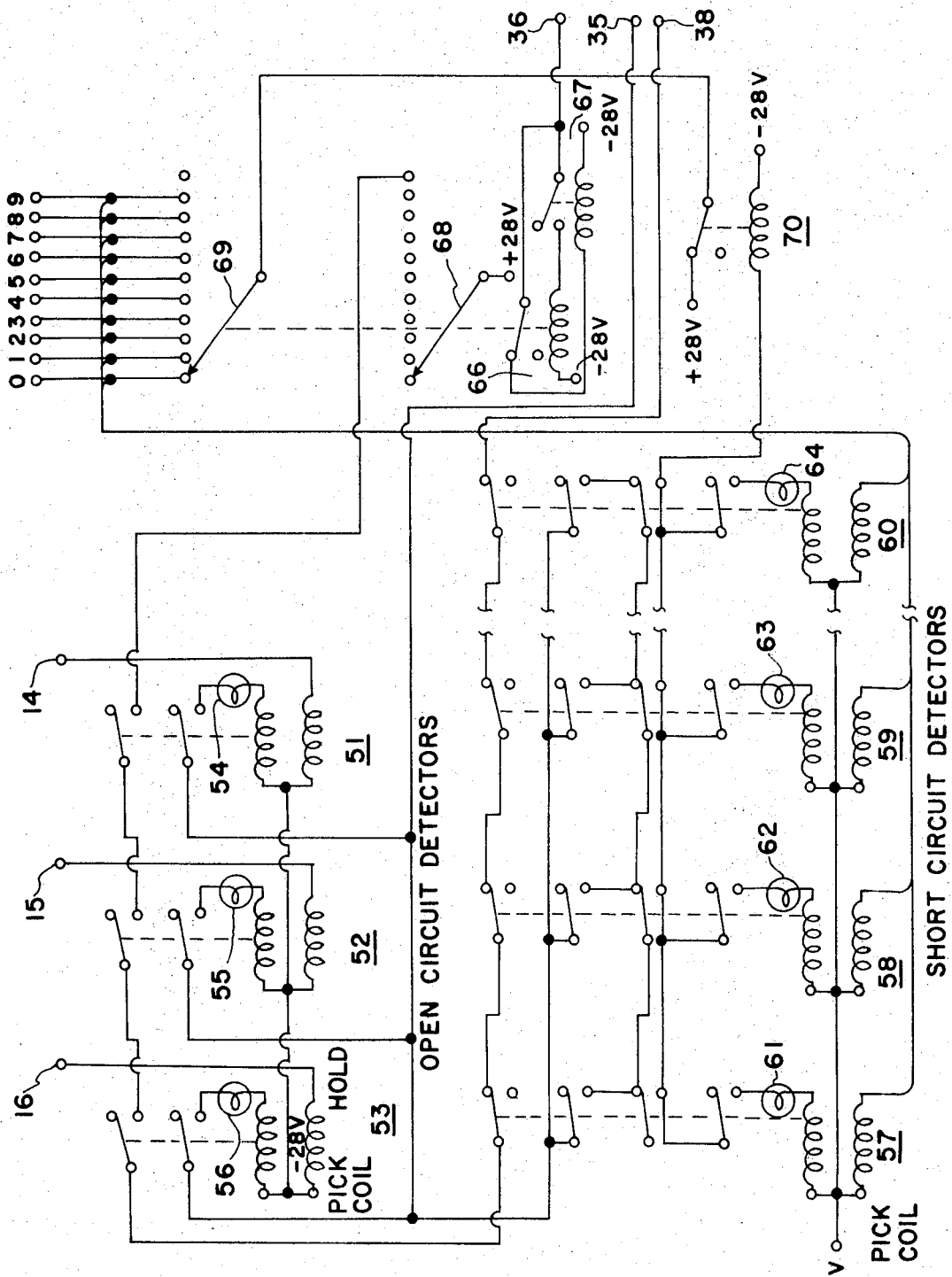
FIG. 2 is a schematic drawing of the circuit tester in FIG. 1.

Referring now to FIG. 2 there is shown a schematic drawing of the circuit tester 13 in FIG. 1. Relays 51, 52, and 53 are ADC open circuit detection relays. Relay 51 detects open circuits in the units decade of the ADC, relay 52 detects open circuits in the tens decade and relay 53 detects open circuits in the hundreds decade. Each of these relays has a pick coil and a hold coil. In the hold coil circuits there are lights 54, 55 and 56 to indicate the locations of open circuits. Each open circuit detection relay has two sets of normally opened contacts. One set is for applying voltage to its hold coil. The other set is for indicating (when they are closed) the absence of an open circuit and are connected in series with the same contacts in all other open circuit detection relays. Relays 57 through 60 are ADC short circuit detection relays. Relay 57 detects short circuits on the 0 terminals of the ADC, relay 58 detects short circuits on the 1 terminals, relay 59 detects short circuits on the 2 terminals and relay 60 detects short circuits on the 9 terminals. Six other relays (not shown) detect short circuits on the 3 through 8 terminals of the ADC. Each of the relays has a pick coil which is connected to one of the 0 through 9 terminals of the ADC and each relay has a hold coil. Lights 61 through 64 are connected in the circuits with the hold coils to indicate the locations of short circuits. Each short circuit detection relay has four sets of contacts. One set is for applying voltage to the holding coil. Another set is for indicating the absence of a short circuit and is connected in series with the same contacts in all other short circuit detection relays and in series with the series connected open circuit detection relay contacts. The other two sets of contacts are for connecting the +28 v. on terminal 35 to the holding coils whenever there exists a short circuit between two terminals. The function of stepping switch 66, which is energized by relay 67, and includes wiper 68 and wiper 69, is to successively apply +28 v. to each of the 0 through 9 terminals of the ADC and then wiper 68 interrogates the open and short circuit relay status. A relay 70 is provided for removing the +28 v. from wiper arm 69 when relay 70, which detects a short circuit, is activated. Removing this voltage stops the interrogation process.

In the operation of this invention switch 21 in FIG. 1 is turned on to apply 110 v. AC power to the circuit and switch 22 is turned on to apply +28 v. DC to the wiper arm of stepping switch 23. Assuming that the wiper arm of stepping switch 23 is in the position shown, the cam of switch 17 rotates until switch 17 closes which applies the +28 v. to the coil of relay 25 causing the contacts of relay 25 to close. This disconnects the 110 v. AC from the ADC motor and disconnects the +85 v. from the motor brake 20 causing the motor to stop. Also when the contacts of relay 25 close the +85 v. is applied through a set of contacts on relays 25, 39, 37 and 29 to the coil of relay 26. Resistor 27 and capacitor 28 delay the operation of relay 26 to provide adequate time for any ADC input shaft coast before removing the +28 v. ADC solenoid voltage for lifting the ADC wipers. When the contacts of relay 26 close the brush lifting solenoids release which engage the ADC wiper arms with the 10 contact stators before interrogation. The operation of relay 26 also gates +85 v. through contacts of relays 26, 37 and 32 to the coil of relay 29. Resistor 30 and capacitor 31 delays the operation of relay 29 to assure wiper contact bounce has settled before ADC contact interrogation. The operation of relay 29 applies +28 v. to the ADC for indexing and gates +85 v. through contacts of relays 29 and 37 to the coil of relay 32. Resistor 33 and capacitor 34 delays the operation of relay 32. Upon the operation of relay 32, +28 v. is applied through contacts of relay 32 to terminals 35 and 36 of circuit tester 13 to initiate the test. Also the +28 v. is supplied through switch 45 and through contacts of relay 32 to the coil of relay 40. Resistor 42 and capacitor 43 provide an RC integrating network that delays the signal applied to the coil of relay 40 approximately 3 seconds which is slightly longer than the interrogating time of circuit tester 13. If circuit tester 13 completes its tests prior to this 3-second interval a signal is produced at output terminal 38 which is applied to the coil of relay 37 actuating its contacts. This removes the voltage applied to the coil of relay 32 causing its contacts to open which prohibits operation of relay 40. If circuit tester 13 does not complete its test within the 3-second interval the voltage applied to the coil of relay 40 will actuate its contacts and apply +28 v. to the coil of relay 41. This results in 110 v. AC being applied to buzzer 44 indicating that the circuit tester 13 has located an open or short circuit in the ADC. In order to reinitiate the tests, switch 45 is actuated causing relay 37 to be actuated which in turn causes all other relays to be released and motor 11 to turn the cam of switch 17 until it again closes switch 17. This continues until switch 17 closes 10 times, then stepping switch control 24 causes stepping switch 23 to step to the contact connected to switch 18. When switch 18 closes 10 times stepping switch 23 steps to the contact connected to switch 19, etc.

Whenever relay 32 is actuated and +28 v. is applied to terminals 35 and 36 of tester 13, the +28 v. applied to terminal 36 passes through the normally closed contact (interrupter) of stepping relay 66 in FIG. 2 to the coil of relay 67. Hence, the contacts of relay 67 close and the +28 v. is applied to the coil of relay 66 causing its contacts to open and causing wiper arms 68 and 69 to step to their next positions. This continues until wiper arms 68 and 69 scan all of their contacts. Assume that the ADC is in the position shown. That is, the units wiper is on contact 6, the tens wiper is on contact 4 and the hundreds wiper is on contact 1. Then, assuming there is no open circuit, when wiper arm 69 is on contact 1, +28 v. is applied through the closed contacts of relay 70, through wiper arm 69 and through terminals 1 and 16 to the pick coil of relay 53. This actuates relay 53 allowing the +28 v. at terminal 35 to pass through the closed contacts of relay 53 to the hold coil of relay 53 which will hold relay 53 energized until voltage is removed from terminal 35. When wiper arm 69 scans contact 4 and contact 6, the contacts of relays 52 and 51, respectively, are closed and held closed by their holding coils. Now assuming there are no short circuits. When wiper 69 is on the 0 terminal, +28 v. is applied through the contacts of relay 70, through wiper arm 69 and through terminal 0 to the pick coil of relay 57 to close its contacts. Inasmuch as there are no short circuits, there is no voltage applied to the holding coil of relay 57. Hence when wiper arm 69 steps to terminal 1 the contacts of relay 57 open and the contacts of relay 58 close. When wiper arm 60 steps to terminal 2 the contacts of relay 58 open and the contacts of relay 59 close, and so on. After wiper arm 69 has scanned all of its contacts, wiper arm 68 makes contact with its contact that is connected to a contact of relay 51. When this happens +28 v. is applied through wiper arm 68, through a set of seriesed contacts on the open circuit relays 51, 52 and 53 and the short circuit detection relays (57 through 60) to terminal 38. This voltage on terminal 38 indicates that there are no open or short circuits and is applied to the coil of relay 37 to reset all relays. When the contacts of relay 26 open+28 v. is applied to a differentiating circuit consisting of a resistor 46 and a capacitor 47 which creates a short duration pulse that is applied to the coil of relay 39 causing the contacts of relay 39 to close for a short period of time. Hence the 110 v. AC is applied to motor 11 for this short period which drives the cam of switch 17 to its next valley allowing switch 17 to open. At this point the device is ready to perform another test. After 10 tests have been performed stepping switch 23 steps to its next position; after 10 more tests have been performed switch 23 steps to its next position; and so on. Hence, as long as there is no open or short circuit in the ADC the device continues to perform its test.

Assume now that there is an open circuit in the ADC between terminal 4 and the hundreds wiper arm. Then when the ADC is in the position shown there will be no voltage at terminal 15 when wiper arm 69 scans terminal 4. Hence relay 52 will not be actuated and its contacts will remain open. Therefore when wiper arm 68 steps to its last position the +28 v. will not be applied to terminal 38. This means that relay 40 has time to operate and actuate relay 41. This removes the +28 v. from terminal 36 and inhibits operation of stepping switch 66 and also applies voltage to buzzer 44 indicating that the tester has discovered an open or short circuit. When the operator checks the lights he sees that lights 54 and 56 are "on" and that light 55 is "off" indicating an open circuit in the tens decade. To restart the testing the operator pushes the restart switch 45.

Assume next that there is a short circuit between the 1 and 2 terminals of the ADC. Then wiper a arm 69 steps to terminals 1 the pick coils of both relays 58 and 59 have the +28 v. applied to them. This closes the contacts of both relays which applies the +28 v. on terminal 35 to hold coils of both relays and to the coil of relay 70. The voltage applied to the coil of relay 70 disconnects the +28 v. from wiper arm 69. As before when wiper arm 68 steps to its last position the +28 v. will not be applied to terminal 38. Hence buzzer 44 sounds and the operator looks at the tester lights. He sees that lights 62 and 63 are "on" indicating a short between terminal 1 and 2 on the ADC. Even though some of the open circuit lights might not be "on", this does not necessarily indicate an open circuit. One of the open circuits lights being out indicates an open circuit only when all of the short circuit lights are out.

The advantages of this invention are that it saves time and eliminates human errors prevalent in repetitive-type tests. The tester that constitutes this invention will perform a more thorough test since fatigue does not influence the test.

It is to be understood that the forms of the invention herewith shown and described is to be taken as a preferred embodiment. Various changes, such as substituting vacuum tubes or transistors for the relays, could be made without departing from the spirit or scope of this invention.

What is claimed as new and desired to be secured by Letters Patent of the United States is:

I claim:

1. Apparatus for automatically testing an ADC for open and short circuits wherein the ADC includes a motor and a shaft with a wiper arm for each decade of the ADC comprising:
   means including said ADC motor for turning the ADC shaft to a specific setting for testing;
   means responsive to said specific setting for stopping said ADC motor and for producing a signal;
   a first group of normally opened contacts connected in series with each other;
   a second group of 10 normally closed contacts connected in series with each other and in series with said first group of contacts;
   means connected to the wiper arms of said ADC shaft for closing the corresponding contact in said first group if no open circuit exists between the wiper and the ADC contact that it is on;
   means connected to the corresponding terminals of each decade of said ADC and responsive to said signal for opening the contacts in said second group corresponding to two terminals if there exists a short circuit between the two terminals;
   means for applying a voltage to one end of said series of contacts whereby if the voltage appears at the other end of said series of contacts there are no open or short circuits in the ADC for said specific setting; and
   means responsive to said voltage at said other end of said series of contacts for turning the ADC to another specific setting for testing.

2. Apparatus according to claim 1 including means for actuating an alarm if said voltage does not appear at said other end of said contacts a predetermined length of time after the beginning of said signal.

3. Apparatus according to claim 2 wherein a light is associated with each of said contacts in said first and second groups and means responsive to said signal are provided for turning on the lights associated with the contacts in said first group that are closed and for turning on the lights associated with the contacts in said second group that are opened whereby the operator of said apparatus upon the actuation of said alarm can determine the location of the open or short circuit.

4. Apparatus according to claim 1 wherein said means responsive to said specific setting for stopping said ADC motor and for producing a signal includes a cam-operated switch for each decade of said ADC.

5. Apparatus according to claim 1 wherein said means for closing the corresponding contact in said first group if no open circuit exists includes a stepping switch for applying a voltage to the wiper arm of each decade providing no open circuit exists.

6. Apparatus according to claim 1 wherein said means for opening the contacts in said second group includes a stepping switch for applying a voltage to all terminals of the ADC.

7. Apparatus according to claim 1 wherein said means for opening the contacts in said second group includes three other contacts associated with each of the contacts in said second group.

8. Apparatus for automatically testing an ADC for open and short circuits wherein the ADC includes a motor and a shaft comprising:
   means including said ADC motor for turning the ADC shaft to a specific setting for testing;
   means responsive to said specific setting for stopping said motor and for producing a signal;
   means connected to said ADC shaft and responsive to said signal for indicating opened and closed circuits in said ADC and for producing a voltage if no opened or closed circuits exists; and
   means responsive to said voltage for turning said ADC to another specific setting.

9. Apparatus according to claim 8 wherein said means for producing a signal includes a cam-operated switch for each decade of the ADC.

10. Apparatus according to claim 8 wherein said means for indicating opened and closed circuits includes a group of contacts connected in series.